United States Patent
Mao

(10) Patent No.: US 12,352,418 B1
(45) Date of Patent: Jul. 8, 2025

(54) LAMP SHEET

(71) Applicant: Guodong Mao, Anhui (CN)

(72) Inventor: Guodong Mao, Anhui (CN)

( * ) Notice: Subject to any disclaimer, the term of this patent is extended or adjusted under 35 U.S.C. 154(b) by 0 days.

(21) Appl. No.: 18/629,596

(22) Filed: Apr. 8, 2024

(30) Foreign Application Priority Data

Jan. 8, 2024 (CN) .......................... 202420042444.0

(51) Int. Cl.

| | |
|---|---|
| *F21V 23/00* | (2015.01) |
| *F21S 9/02* | (2006.01) |
| *F21V 23/04* | (2006.01) |
| *F21V 23/06* | (2006.01) |
| *F21Y 105/00* | (2016.01) |
| *F21Y 115/10* | (2016.01) |

(52) U.S. Cl.
CPC .............. *F21V 23/008* (2013.01); *F21S 9/02* (2013.01); *F21V 23/001* (2013.01); *F21V 23/04* (2013.01); *F21V 23/06* (2013.01); *F21Y 2105/00* (2013.01); *F21Y 2115/10* (2016.08)

(58) Field of Classification Search
CPC ...... F21V 23/008; F21V 23/001; F21V 23/04; F21V 23/06; F21S 9/02
See application file for complete search history.

(56) References Cited

U.S. PATENT DOCUMENTS

| | | | | |
|---|---|---|---|---|
| 11,054,125 | B1* | 7/2021 | Chen | F21V 23/06 |
| 11,510,303 | B1* | 11/2022 | Tsai | H05B 47/155 |
| 2004/0183774 | A1* | 9/2004 | Manabe | G02B 6/0021 |
| | | | | 345/102 |
| 2010/0142224 | A1* | 6/2010 | Zhang | G02B 6/0043 |
| | | | | 362/317 |
| 2011/0228556 | A1* | 9/2011 | Wang | G02B 6/0036 |
| | | | | 362/606 |
| 2018/0321555 | A1* | 11/2018 | Hata | G02B 6/0055 |
| 2019/0278016 | A1* | 9/2019 | Xiao | G02B 6/0061 |
| 2021/0148559 | A1* | 5/2021 | Huang | G02B 6/0043 |

* cited by examiner

*Primary Examiner* — Christopher E Dunay

(57) ABSTRACT

A lamp sheet includes a transparent flake-like lamp sheet body. A power supply end, electrically connected to the lamp sheet body through a lead wire. The power supply end is configured to supply power to the lamp sheet body. A surface of the lamp sheet body is provided with neatly arranged and distributed reflective points. An area of the reflective points gradually increases along one end of the lamp sheet body away from the lead wire. The lamp sheet can be made transparent, so that it is convenient for a user to see an external environment clearly through the lamp sheet when the lamp sheet is applied to a mask. Furthermore, the reflective points are configured, which can enable the lamp sheet to emit light uniformly. Moreover, there are various plans for the power supply end, which brings various power supply ways for the lamp sheet.

18 Claims, 9 Drawing Sheets

LAMP SHEET

CROSS-REFERENCE TO RELATED APPLICATIONS

The application claims priority of Chinese patent application CN2024200424440, filed on Jan. 8, 2024, which is incorporated herein by reference in its entireties.

TECHNICAL FIELD

The present disclosure relates to the field of lighting lamps, and in particular, to a lamp sheet.

BACKGROUND

With the widespread promotion of some film and television works and animation works, some props have got noticed and loved. In recent years, as the manufacturing level has been continuously improved, helmets, masks, and other props that had appeared in some film and television works and animation works have also been manufactured and sold. Many props such as the helmets and masks are provided with luminous lamp sheets at their eye parts. However, at present, the lamp sheets on many props on the market have the problem of non-uniform light emission and are not transparent, which affects the user experience.

Therefore, the present disclosure provides a lamp sheet that can effectively solve the above-mentioned problems.

SUMMARY

In order to overcome the shortcomings of the prior art, the technical solution adopted by the present disclosure to solve the technical problem is as follows.

A lamp sheet includes:
a transparent flake-like lamp sheet body; and
a power supply end, electrically connected to the lamp sheet body through a lead wire, wherein the power supply end is configured to supply power to the lamp sheet body;
a surface of the lamp sheet body is provided with neatly arranged and distributed reflective points; and an area of the reflective points gradually increases along one end of the lamp sheet body away from the lead wire.

Further, one end of the lamp sheet body is provided with a light source electrically connected to the lead wire, and the light source is welded to a tail end of the lead wire.

Further, the lamp sheet body is provided with a clamping slot at one end close to the power supply end, and the clamping slot is matched with a size of the light source; and the light source is mounted in the clamping slot.

Further, the light source is fixed in the clamping slot through glue, or the light source is in interference fit with the clamping slot.

Further, an opaque reflective sticker is arranged on a peripheral side wall of the lamp sheet body, and the reflective sticker is provided with a reflective layer on one side close to the lamp sheet body.

Further, the lamp sheet body is provided with two chamfers at one end where the light source is mounted, and the two chamfers are respectively located on two sides of the light source.

Further, there are two lamp sheet bodies.

Further, the lead wire includes a first section of lead wire and a second section of lead wire; the first section of lead wire includes a first positive electrode wire electrically connected to a positive electrode of the power supply end and a first negative electrode wire electrically connected to a negative electrode of the power supply end; the second section of lead wire includes two second positive electrode wires electrically connected to the first positive electrode wire and two second negative electrode wires electrically connected to the first negative electrode wire; and each of the two light sources is electrically connected to one of the second positive electrode wires and one of the second negative electrode wires.

Further, a joint between each second positive electrode wire and the first positive electrode wire and a joint between the first negative electrode wire and each second negative electrode wire are both wrapped with first plastic insulating tubes.

Further, outer side walls of the first positive electrode wire and the first negative electrode wire are connected; and outer side walls of the second positive electrode wire and the second negative electrode wire which are correspondingly connected to the same light source.

Further, the lead wire includes two third positive electrode wires electrically connected to the positive electrode of the power supply end and two third negative electrode wires electrically connected to the negative electrode of the power supply end; and the light sources on the two lamp sheet bodies are electrically connected to one of the third positive electrode wires and one of the third negative electrode wires.

Further, a joint between each third positive electrode wire and the light source and a joint between each third negative electrode wire and the light source are wrapped with second plastic insulating tubes.

Further, the lamp sheet further includes a control switch; and the control switch is connected in series between the power supply end and the light source.

Further, the power supply end is a battery box; the battery box includes an outer shell and a battery arranged in the outer shell; and the battery is electrically connected to the light source through the lead wire.

Further, the control switch is arranged on the outer shell.

Further, the battery box further includes a cover plate detachably connected to the outer shell.

Further, one end of the outer shell is provided with a first clamping block; one end of the cover plate is provided with a first lug; a first clamping hole matched with the first clamping block is formed in the first lug; a second lug is arranged at one end of the outer shell opposite to the first clamping block; a second clamping hole is formed in the second lug; a second clamping block is arranged at one end of the cover plate opposite to the first lug; and a size of the second clamping block is matched with a size of the second clamping hole.

Further, a surface of the cover plate is provided with a plurality of convex bars.

Further, a width of the reflective sticker is the same as a thickness of the lamp sheet body, and the light source is a light-emitting diode (LED).

Further, the power supply end is a power interface, and the power interface is configured to be connected to a power supply; and the control switch is arranged on the lead wire at one end of the lead wire away from the lamp sheet body.

The present disclosure has the beneficial effects: By the arrangement of the above structure, the lamp sheet can be made transparent, so that it is convenient for a user to see an external environment clearly through the lamp sheet when the lamp sheet is applied to a mask. Furthermore, the reflective points are configured, which can enable the lamp sheet to emit light uniformly. Moreover, there are various plans for the power supply end, which brings various power supply ways for the lamp sheet.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Figure 1:
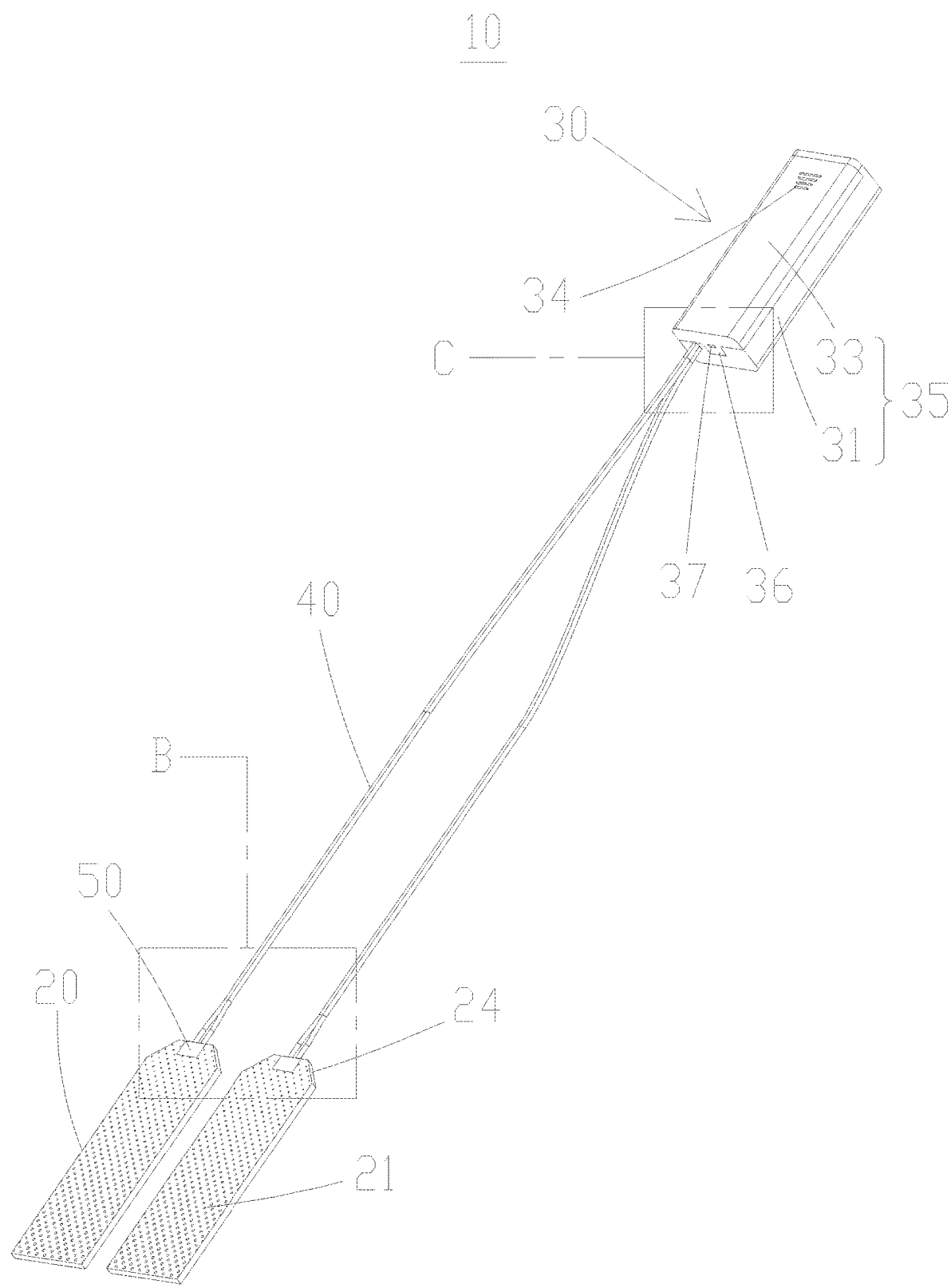
FIG. 1 is a schematic diagram of an overall structure of a lamp sheet.
Figure 2:
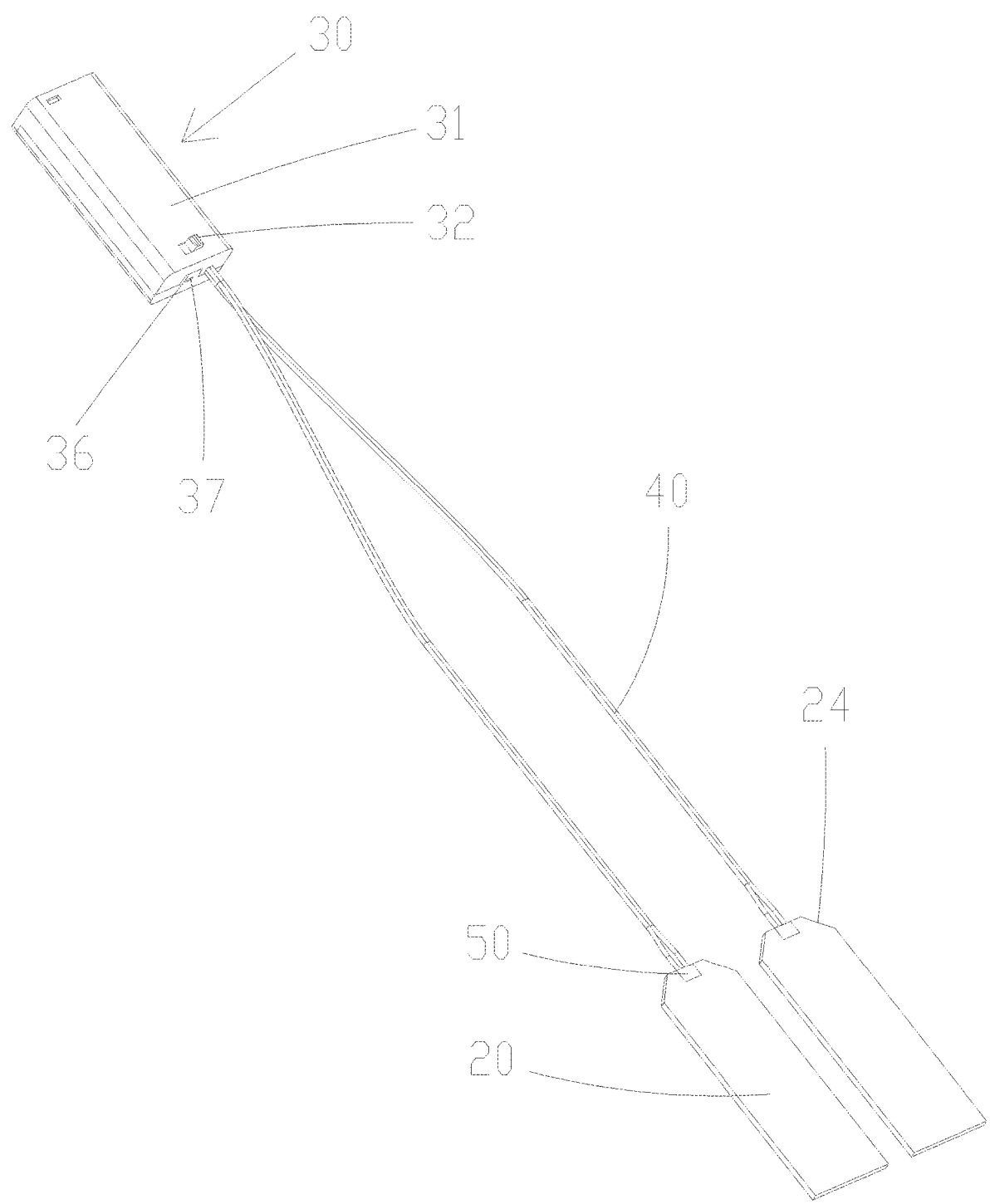
FIG. 2 is a schematic diagram of an overall structure of a lamp sheet in another angle.
Figure 3:
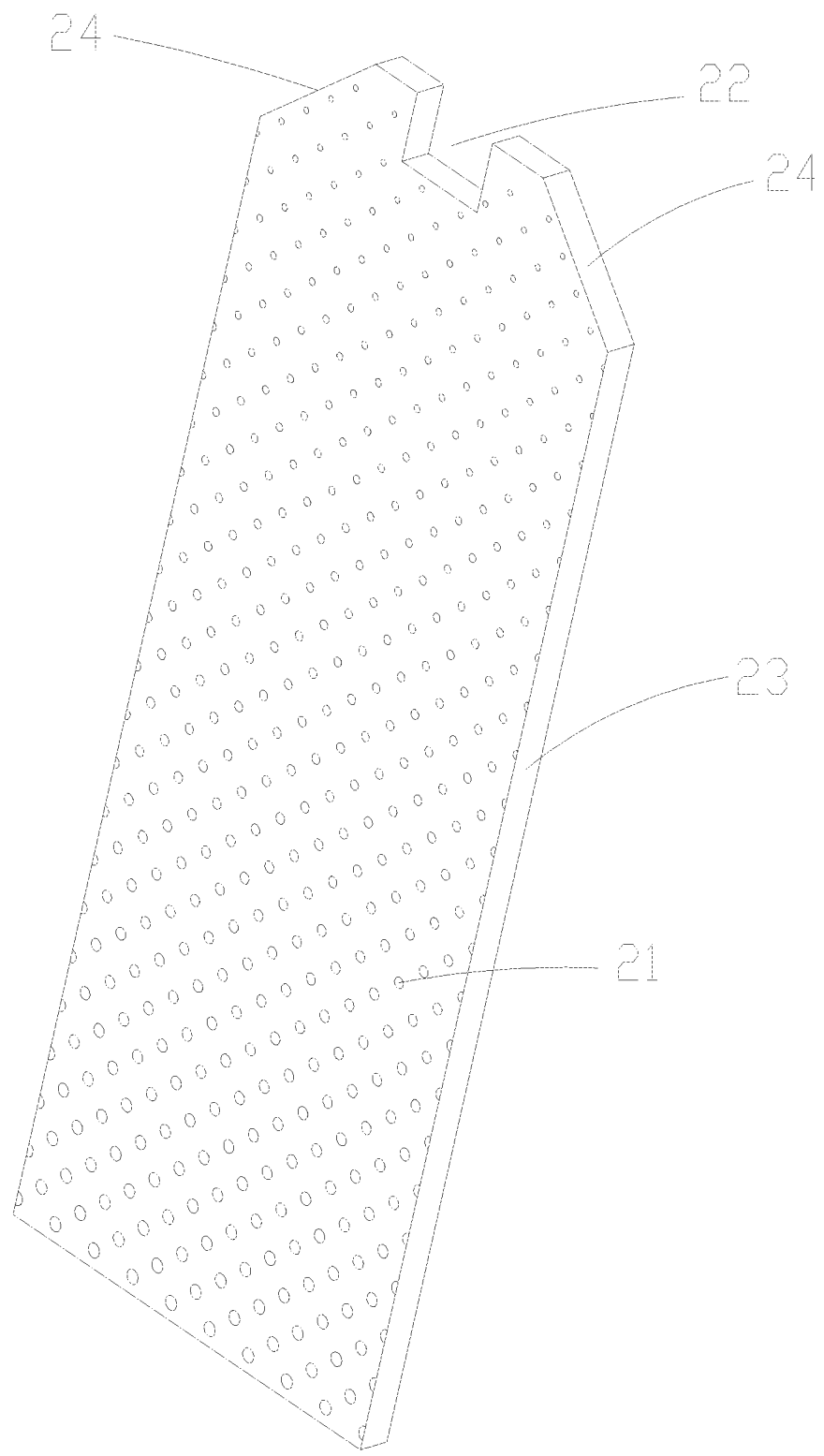
FIG. 3 is a schematic diagram of a three-dimensional structure of a lamp sheet body.
Figure 4:
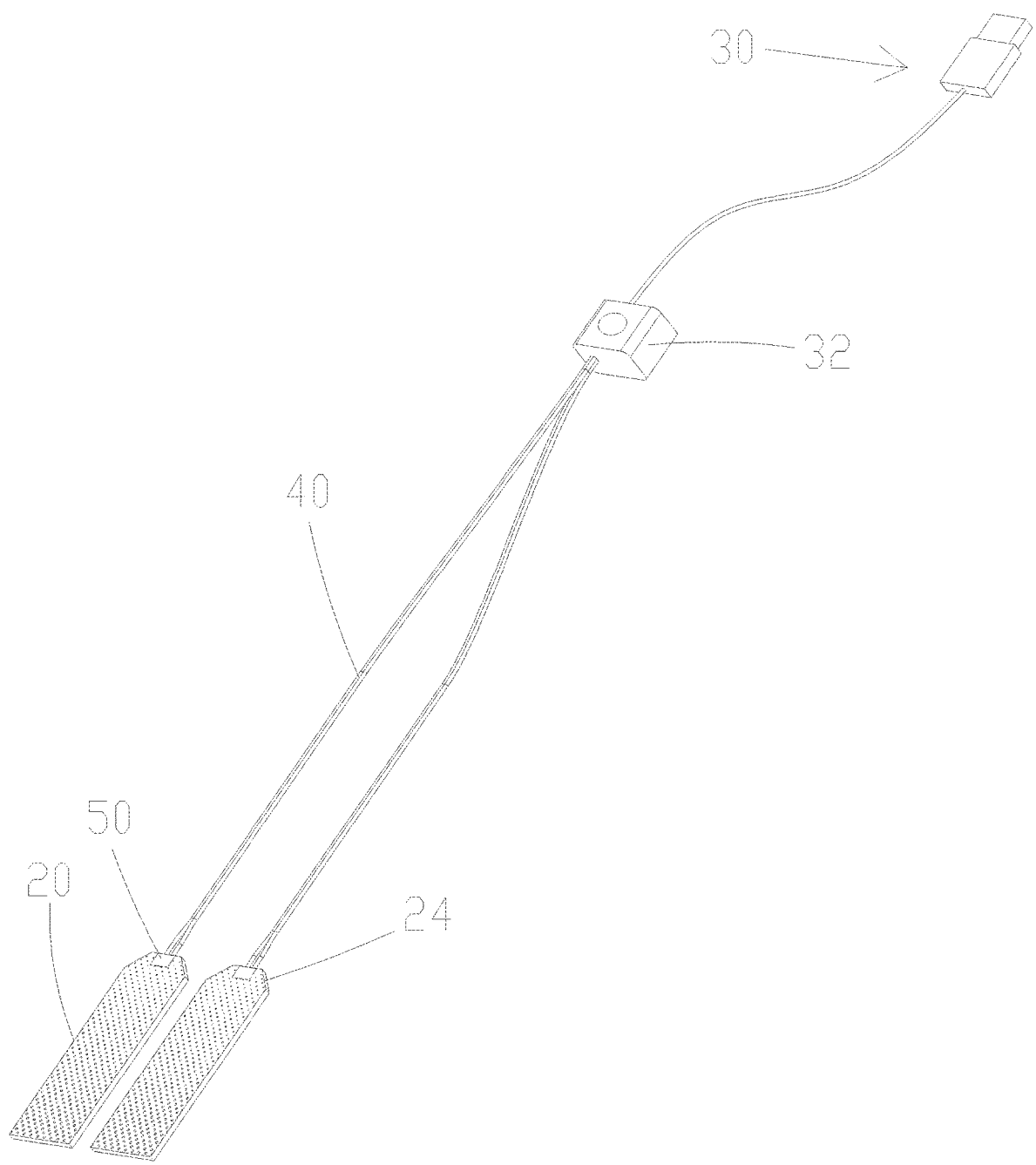
FIG. 4 is a diagram of a usage state of a lamp sheet.
Figure 5:
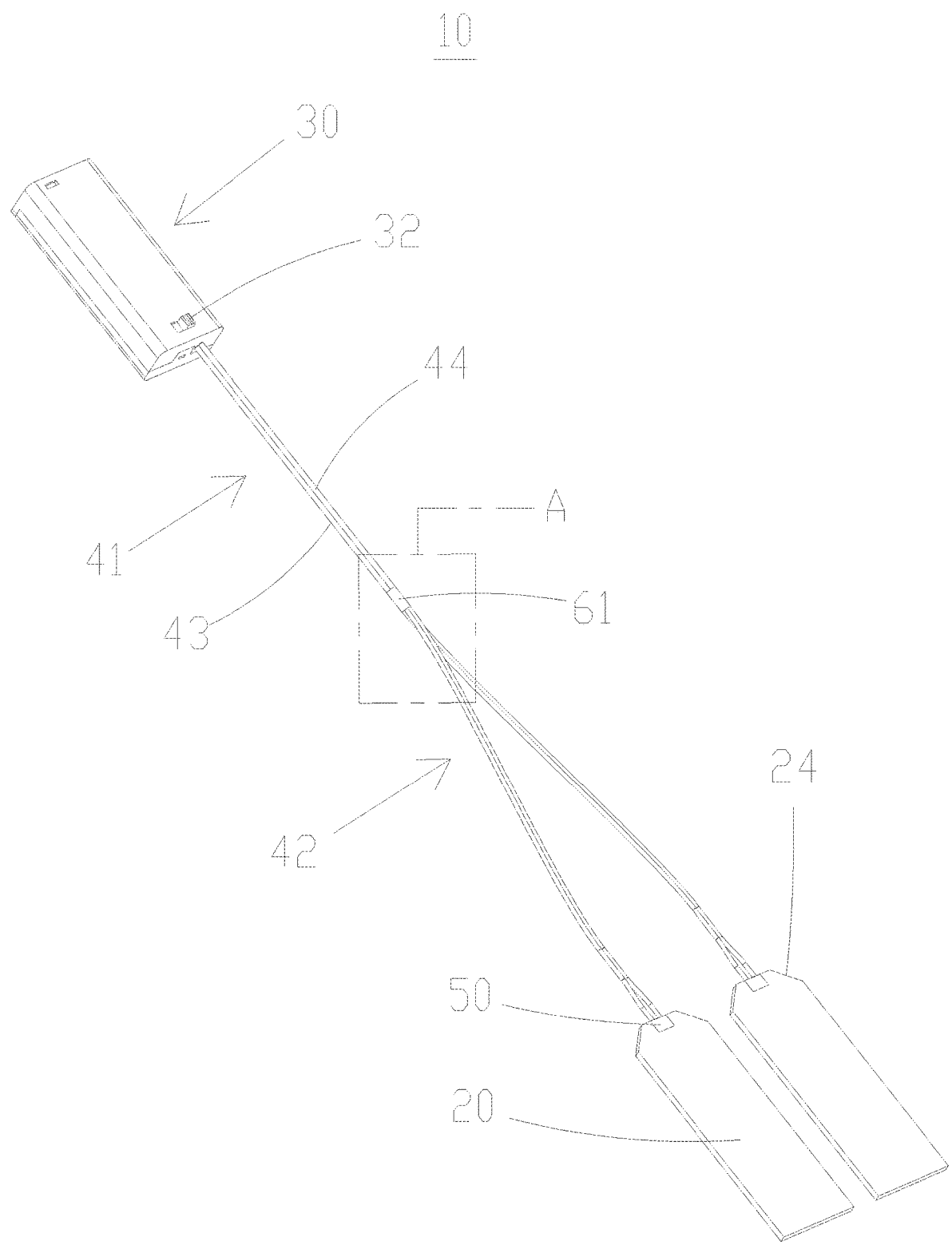
FIG. 5 is a diagram of another state of a lamp sheet.
Figure 6:
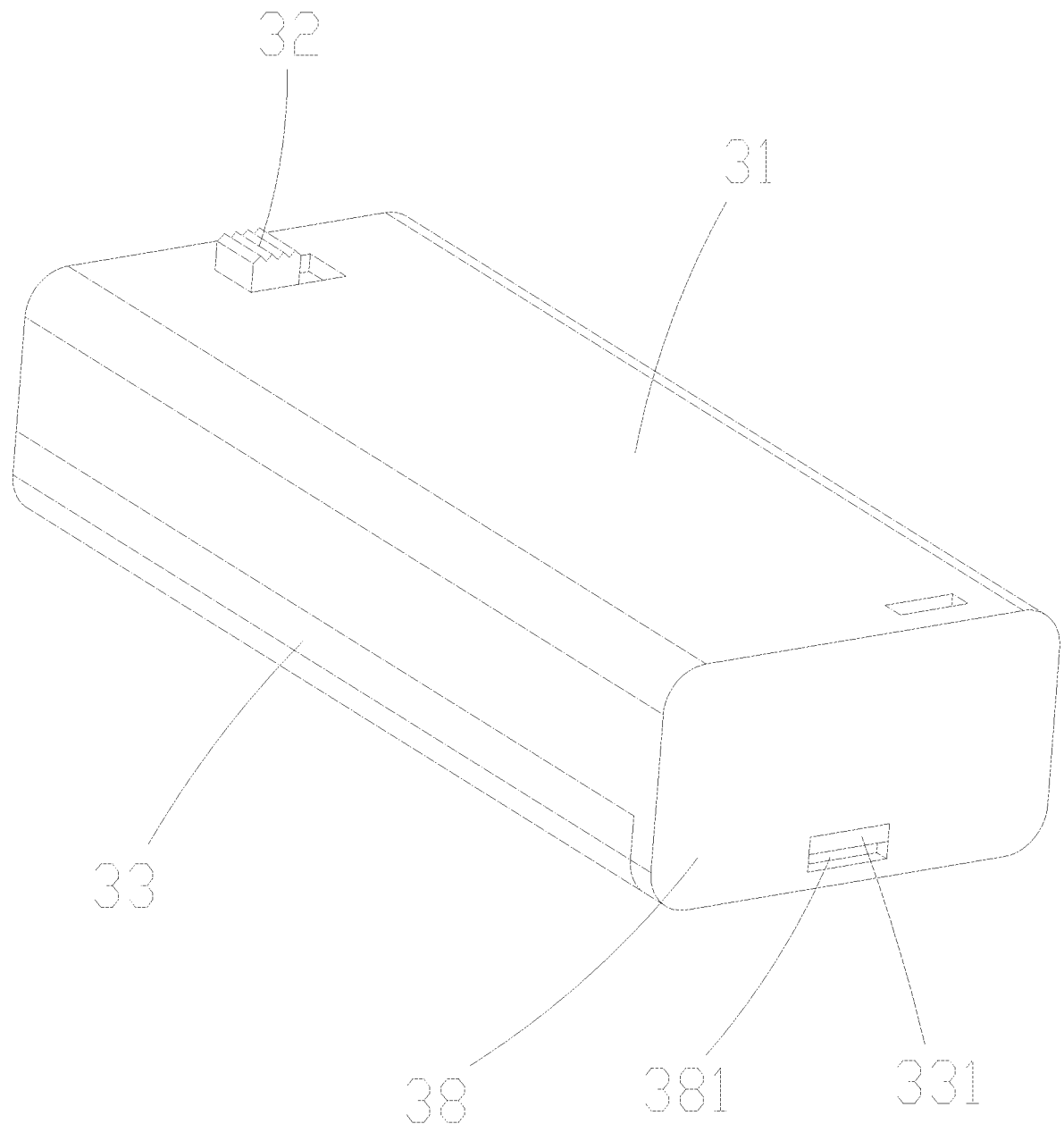
FIG. 6 is a schematic diagram of a three-dimensional structure of a battery box.
Figure 7:
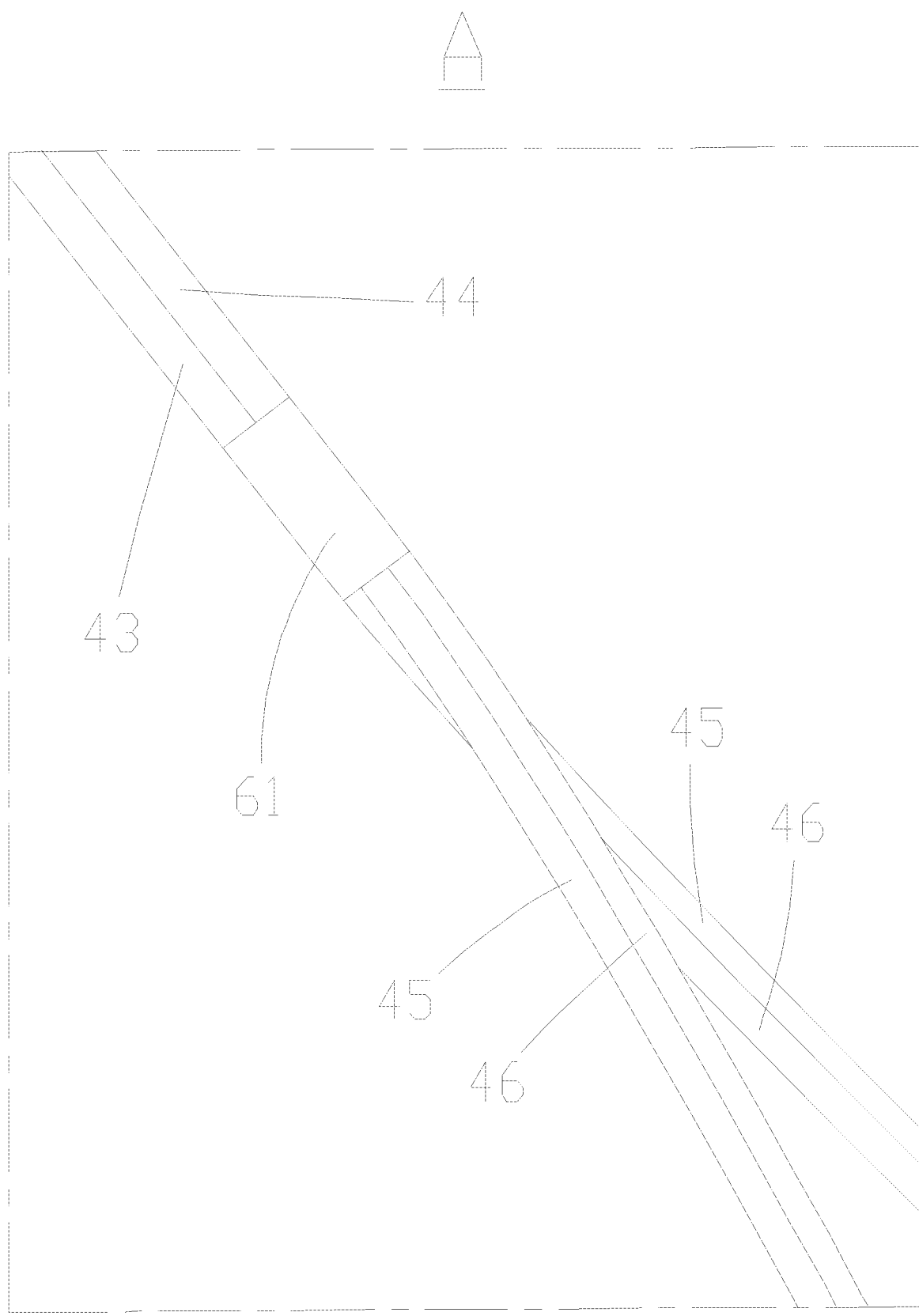
FIG. 7 is an enlarged diagram of A in FIG. 5.
Figure 8:
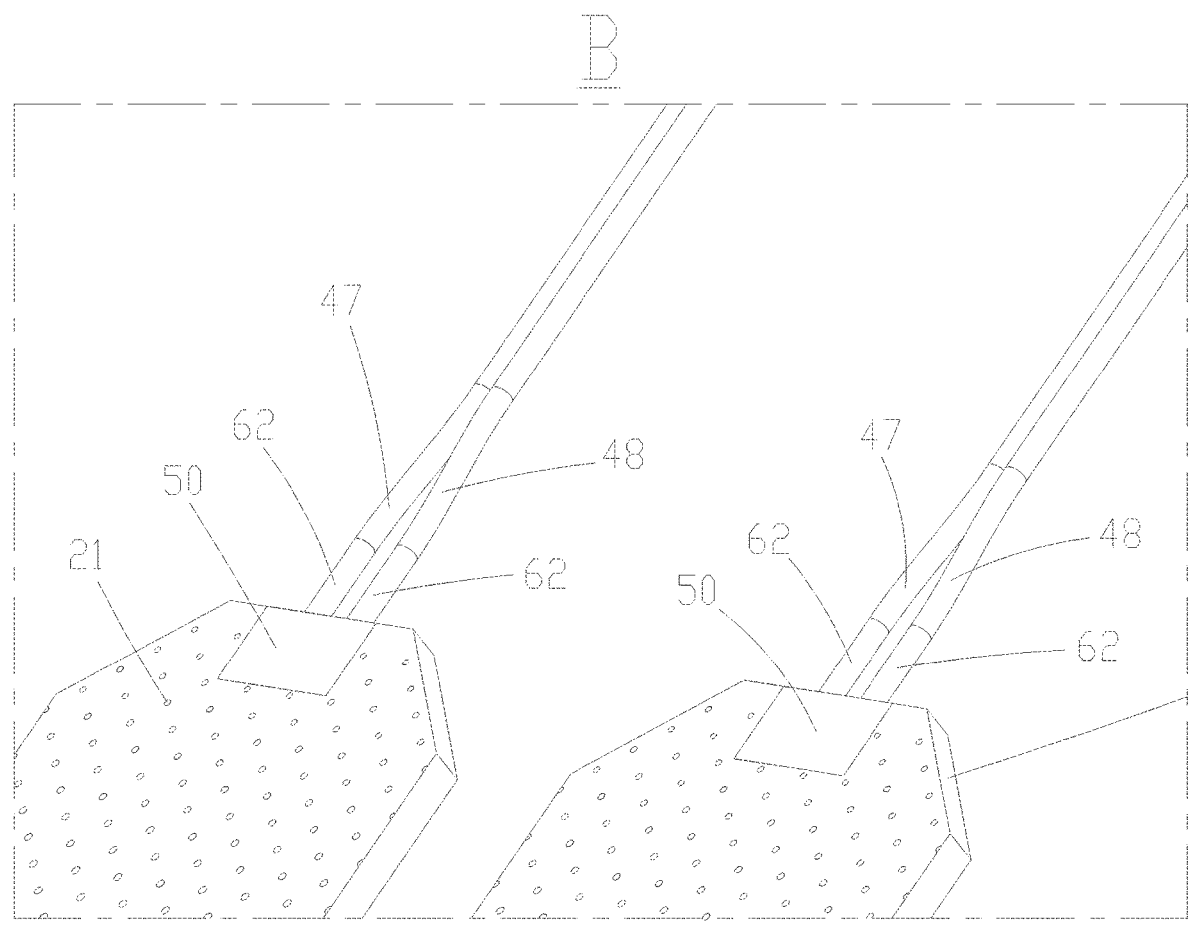
FIG. 8 is an enlarged diagram of B in FIG. 1.
Figure 9:
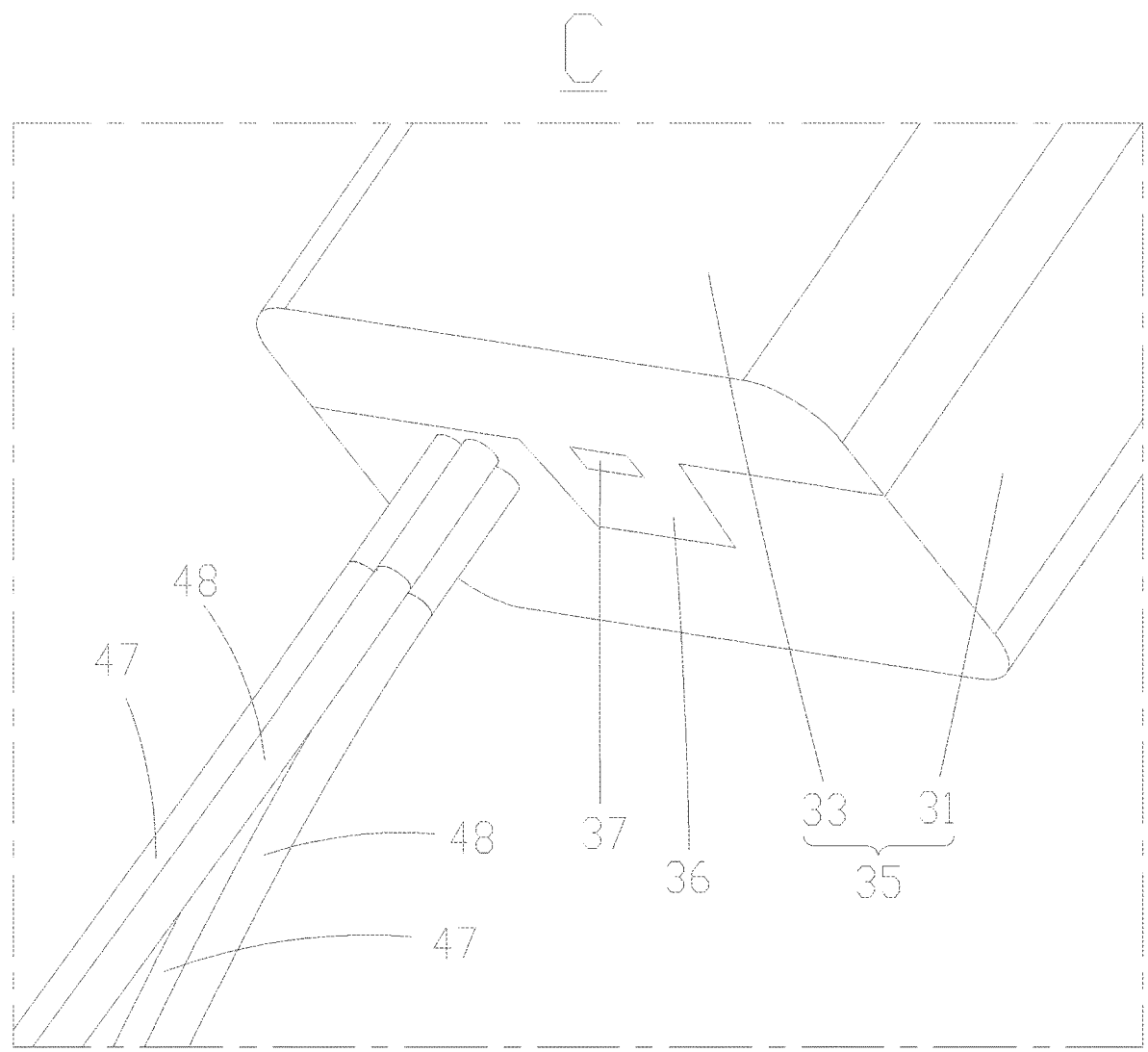
FIG. 9 is an enlarged diagram of C in FIG. 1.

Referring to FIG. 1 to FIG. 9, the present disclosure provides a lamp sheet 10, including:
a transparent flake-like lamp sheet body 20; and
a power supply end 30, electrically connected to the lamp sheet body 20 through a lead wire 40, wherein the power supply end 30 is configured to supply power to the lamp sheet body 20.

A surface of the lamp sheet body 20 is provided with neatly arranged and distributed reflective points 21; and an area of the reflective points 21 gradually increases along one end of the lamp sheet body 20 away from the lead wire 40.

It can be understood that the lamp sheet 10 provided by the present disclosure uses the transparent flake-like lamp sheet body 20, which can improve the transparency of the lamp sheet 10. When the lamp sheet is mounted at the eye parts of a prop such as a mask and a helmet, a user can clearly see the outside through the lamp sheet body 20, improving the user experience. If the reflective points 21 are closer to a luminous position, the area of the reflective points 21 indicates that more lights are reflected. The light at a far end from the luminous position will become weak after being refracted. The reflective points 21 with a larger area can improve the intensity of the distant light. Meanwhile, the reflective points 21 with a smaller area can also reflect weak light. When the reflective points 21 with the smaller area are used at a closer distance to the luminous position, the intensity of the light can be reduced, and the orderly arrangement of the reflective points 21 can make the light inside the lamp sheet body 20 more uniform. The power supply end 30 supplies power to the lamp sheet 10 through the lead wire 40. More kinds of power supply ways can be provided for the lamp sheet 10 to facilitate use in multiple scenarios by the user.

Further, one end of the lamp sheet body 20 is provided with a light source 50 electrically connected to the lead wire 40, and the light source 50 is welded to a tail end of the lead wire 40.

It can be understood that the lamp sheet 10 achieves a light-emitting function through the refraction, inside the lamp sheet body 20, of light emitted by the light source 50.

Further, the lamp sheet body 20 is provided with a clamping slot 22 at one end close to the power supply end 30, and the clamping slot is matched with a size of the light source 50; and the light source 50 is mounted in the clamping slot 22.

It can be understood that the light source 50 is mounted in the clamping slot 22, so that the light source 50 can be embedded into the lamp sheet body 20, thereby maximizing the utilization of the light emitted by the light source 50 and making the lamp sheet body 20 brighter.

Further, the light source 50 is fixed in the clamping slot 22 through glue, or the light source 50 is in interference fit with the clamping slot 22.

It can be understood that the light source 50 is mounted in the clamping slot 22 through the glue or the interference fit to facilitate the mounting of the light source 50. When the user pulls the lead wire 40, the light source 50 can be removed to prevent a greater injury to the user because the lead wire 40 is torn from the middle, and a protection effect is achieved.

Further, an opaque reflective sticker 23 is arranged on a peripheral side wall of the lamp sheet body 20, and the reflective sticker 23 is provided with a reflective layer on one side close to the lamp sheet body 20.

It can be understood that the reflective layer arranged on the side of the reflective sticker 23 close to the lamp sheet body 20 can reflect the light emitted by the light source 50, so that the light emitted by the light source 50 can be refracted in the lamp sheet body 20, and the brightness of the lamp body 10 can be improved.

Further, the lamp sheet body 20 is provided with two chamfers 24 at one end where the light source 50 is mounted, and the two chamfers 24 are respectively located on two sides of the light source 50.

It can be understood that chamfers 24 are located on the two sides of the light source 50, which can reflect the light emitted by the light source 50 and improve the brightness of the lamp sheet 10.

Further, there are two lamp sheet bodies 20.

It can be understood that the two lamp sheet bodies 20 can be mounted at the eye parts of some props such as a mask and a helmet to make its eye parts emit light.

In an embodiment, the lead wire 40 includes a first section of lead wire 41 and a second section of lead wire 42; the first section of lead wire 41 includes a first positive electrode wire 43 electrically connected to a positive electrode of the power supply end 30 and a first negative electrode wire 44 electrically connected to a negative electrode of the power supply end 30; the second section of lead wire 42 includes two second positive electrode wires 45 electrically connected to the first positive electrode wire 43 and two second negative electrode wires 46 electrically connected to the first negative electrode wire 44; and each of the two light sources 50 is electrically connected to one of the second positive electrode wires 45 and one of the second negative electrode wires 46.

It can be understood that the first section of lead wire 41 includes the first positive electrode wire 43 and the first negative electrode wire 44. At the second section of lead wire 42, the two second positive electrode wires 45 are connected to the first positive electrode wire 43, and two second negative electrode wires 46 are connected to the first negative electrode wire 44. This design can reduce the number of wire bodies at a front end of the lead wire 40, so that the wire bodies are neat, and the use experience is improved.

Further, a joint between each second positive electrode wire 45 and the first positive electrode wire 43 and a joint between the first negative electrode wire 44 and each second negative electrode wire 46 are both wrapped with first plastic insulating tubes 61.

It can be understood that wrapping the first plastic insulating tubes 61 can achieve sealing, waterproof, and anti-leakage effects on the joint between the second positive electrode wire 45 and the first positive electrode wire 43 and the joint between the first negative electrode wire 44 and each second negative electrode wire 46.

Further, outer side walls of the first positive electrode wire 43 and the first negative electrode wire 44 are connected; and outer side walls of the second positive electrode wire 45 and the second negative electrode wire 46 which are correspondingly connected to the same light source 50.

It can be understood that insulating outer skins of the first positive electrode wire 43 and the first negative electrode wire 44 are connected together, and insulating outer skins of the second positive electrode wire 45 and the second negative electrode wire 46 are connected together. This design can prevent the influence on use caused by the fact that too many wire bodies are in a mess or are entangled together.

In another embodiment, the lead wire 40 can further include two third positive electrode wires 47 electrically connected to the positive electrode of the power supply end 30 and two third negative electrode wires 48 electrically connected to the negative electrode of the power supply end 30; and the light sources 50 on the two lamp sheet bodies 20 are electrically connected to one of the third positive electrode wires 47 and one of the third negative electrode wires 48.

It can be understood that the two third positive electrode wires 47 and the two third negative electrode wires 48 extend from the power supply end 30, so that a longer distance can be reserved between the two lamp sheet bodies 20, and the user can place the two lamp sheet bodies 20 in more positions when using the two lamp sheet bodies. More choices are provided for the user.

Further, a joint between each third positive electrode wire 47 and the light source 50 and a joint between each third negative electrode wire 48 and the light source 50 are wrapped with second plastic insulating tubes 62.

It can be understood that wrapping the second plastic insulating tubes 62 can achieve sealing, waterproof, and anti-leakage effects on the joints of the third positive electrode wire 47 and the third negative electrode wire 48.

Further, the lamp sheet 10 further includes a control switch 32; and the control switch 32 is connected in series between the power supply end 30 and the light source 50.

It can be understood that the control switch 32 can control disconnection and connection between the power supply end 30 and the light source 50. The user can use the lamp sheet 10 through the control switch 32 at any time according to a need.

In an embodiment, the power supply end 30 is a battery box 35; the battery box 35 includes an outer shell 31 and a battery arranged in the outer shell 31; and the battery is electrically connected to the light source 50 through the lead wire 40.

It can be understood that the battery can be a dry battery, a button battery, a rechargeable battery, and the like, which can facilitate the user to replace the battery or power the lamp sheet 10 to improve the service time.

Further, the control switch 32 is arranged on the outer shell 31.

It can be understood that the battery box and the control switch 32 are integrated on one shell, which can reduce the volume of the power supply end 30, making it convenient for the user to carry and use.

Further, the battery box 35 further includes a cover plate 33 detachably connected to the outer shell 31.

It can be understood that through the detachable cover plate 33, the battery of the lamp sheet 10 can be replaced, which provides more choices for the user.

Further, one end of the outer shell 31 is provided with a first clamping block 37; one end of the cover plate 33 is provided with a first lug 36; a first clamping hole matched with the first clamping block 37 is formed in the first lug 36; a second lug 38 is arranged at one end of the outer shell 31 opposite to the first clamping block 37; a second clamping hole 381 is formed in the second lug 38; a second clamping block 331 is arranged at one end of the cover plate 33 opposite to the first lug 36; and a size of the second clamping block 331 is matched with a size of the second clamping hole 381.

It can be understood that the T-shaped first lug 36 extends from a side wall of the shorter end of the cover plate 33, and the second lug 38 extends from a side wall of the shorter side of the outer shell 31. When the cover plate 33 is mounted on the outer shell 31, the first clamping block 37 is clamped in the first clamping hole, so that one end of the cover plate 33 is fixed with one end of the outer shell 31; and the second clamping block 331 is clamped in the second clamping hole 381, so that the other end of the cover plate 33 is fixed with the other end of the outer shell 31. When the cover plate 33 is separated from the outer shell 31, the first clamping block 37 is separated from the first clamping hole, and the second clamping block 331 is separated from the second clamping hole 381.

Further, a surface of the cover plate 33 is provided with a plurality of convex bars 34.

It can be understood that the convex bars 34 arranged on the cover plate 33 can increase the friction, making it easier for the user to open the cover plate 33 and replace the battery.

Further, a width of the reflective sticker 23 is the same as a thickness of the lamp sheet body 20, and the light source 50 is an LED.

It can be understood that the width of the reflective sticker 23 is equal to the thickness of the lamp sheet body 20, so that when the reflective sticker 23 is stuck to the lamp sheet body 20, the light may not leak out from an edge of the lamp sheet body 20. The LED has advantages of small volume, long service life, low power consumption, and the like. Using the LED as the light source 50 can prolong the service life of the lamp sheet 10 and improve the use experience.

In some other embodiments, the power supply end 30 is a power interface, and the power interface is configured to be connected to a power supply; and the control switch 32 is arranged on one end of the lead wire 40 away from the lamp sheet body 20.

It can be understood that the power interface is a universal serial bus (USB) interface or a direct current interface. Using the USB interface or the direct current interface to supply power can satisfy multiple scenarios. For example, an interface of a computer or interfaces of some chargers can be connected using the USB interface or the direct current interface, which facilitates the use. Moreover, the control switch 32 and the power supply end 30 are separately designed, which can facilitate the user to set the position of the control switch 32 and facilitate operations of the user to control turning on and turning off of the light source 50.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A lamp sheet, comprising:
a transparent flake-like lamp sheet body; and
a power supply end, electrically connected to the lamp sheet body through a lead wire, wherein the power supply end is configured to supply power to the lamp sheet body;
a surface of the lamp sheet body is provided with neatly arranged and distributed reflective points; and an area of the reflective points gradually increases along one end of the lamp sheet body away from the lead wire,
one end of the lamp sheet body is provided with a light source electrically connected to the lead wire,
the lamp sheet body is provided with a clamping slot at one end close to the power supply end, and the clamping slot is matched with a size of the light source; and the light source is mounted in the clamping slot.

2. The lamp sheet according to claim 1, wherein the light source is welded to a tail end of the lead wire.

3. The lamp sheet according to claim 2, wherein the lamp sheet further comprises a control switch; and the control switch is connected in series between the power supply end and the light source.

4. The lamp sheet according to claim 3, wherein the power supply end is a battery box; the battery box comprises an outer shell and a battery arranged in the outer shell; and the battery is electrically connected to the light source through the lead wire.

5. The lamp sheet according to claim 4, wherein the control switch is arranged on the outer shell.

6. The lamp sheet according to claim 4, wherein the battery box further comprises a cover plate detachably connected to the outer shell.

7. The lamp sheet according to claim 6, wherein a surface of the cover plate is provided with a plurality of convex bars.

8. The lamp sheet according to claim 3, wherein the power supply end is a power interface, and the power interface is configured to be connected to a power supply; and the control switch is arranged on one end of the lead wire away from the lamp sheet body.

9. The lamp sheet according to claim 1, wherein the light source is fixed in the clamping slot through glue, or the light source is in interference fit with the clamping slot.

10. The lamp sheet according to claim 1, wherein an opaque reflective sticker is arranged on a peripheral side wall of the lamp sheet body, and the reflective sticker is provided with a reflective layer on one side close to the lamp sheet body.

11. The lamp sheet according to claim 10, wherein the lamp sheet body is provided with two chamfers at one end where the light source is mounted, and the two chamfers are respectively located on two sides of the light source.

12. The lamp sheet according to claim 11, wherein there are two lamp sheet bodies.

13. The lamp sheet according to claim 12, wherein the lead wire comprises a first section of lead wire and a second section of lead wire; the first section of lead wire comprises a first positive electrode wire electrically connected to a positive electrode of the power supply end and a first negative electrode wire electrically connected to a negative electrode of the power supply end; the second section of lead wire comprises two second positive electrode wires electrically connected to the first positive electrode wire and two second negative electrode wires electrically connected to the first negative electrode wire; and each of the two light sources is electrically connected to one of the second positive electrode wires and one of the second negative electrode wires.

14. The lamp sheet according to claim 13, wherein a joint between each second positive electrode wire and the first positive electrode wire and a joint between the first negative electrode wire and each second negative electrode wire are both wrapped with first plastic insulating tubes.

15. The lamp sheet according to claim 13, wherein outer side walls of the first positive electrode wire and the first negative electrode wire are connected; and outer side walls of the second positive electrode wire and the second negative electrode wire which are correspondingly connected to the same light source.

16. The lamp sheet according to claim 12, wherein the lead wire comprises two third positive electrode wires electrically connected to the positive electrode of the power supply end and two third negative electrode wires electrically connected to the negative electrode of the power supply end; and the light sources on the two lamp sheet bodies are electrically connected to one of the third positive electrode wires and one of the third negative electrode wires.

17. The lamp sheet according to claim 16, wherein a joint between each third positive electrode wire and the light source and a joint between each third negative electrode wire and the light source are wrapped with second plastic insulating tubes.

18. The lamp sheet according to claim 10, wherein a width of the reflective sticker is the same as a thickness of the lamp sheet body, and the light source is a light-emitting diode (LED).

\* \* \* \* \*